(12) United States Patent
Ueda et al.

(10) Patent No.: US 7,409,705 B2
(45) Date of Patent: Aug. 5, 2008

(54) SYSTEM AND METHOD FOR USER AUTHENTICATION

(75) Inventors: Yukiya Ueda, Tokyo (JP); Tsugune Saito, Tokyo (JP); Shigetomo Tamai, Tokyo (JP)

(73) Assignee: Computer Systems Engineering Co., Ltd., Tokyo (JP)

( * ) Notice: Subject to any disclaimer, the term of this patent is extended or adjusted under 35 U.S.C. 154(b) by 25 days.

(21) Appl. No.: 11/450,071

(22) Filed: Jun. 9, 2006

(65) Prior Publication Data

US 2007/0226784 A1    Sep. 27, 2007

(30) Foreign Application Priority Data

Mar. 27, 2006    (JP)    ............................. 2006-086603

(51) Int. Cl.
 *G06F 7/04* (2006.01)
(52) U.S. Cl. ................. 726/5; 726/6; 726/18; 713/182; 713/186; 382/115
(58) Field of Classification Search ...................... 726/5, 726/6, 18; 713/169, 168, 182, 186; 380/54; 382/115
See application file for complete search history.

(56) References Cited

U.S. PATENT DOCUMENTS

| | | | | |
|---|---|---|---|---|
| 6,246,769 | B1 * | 6/2001 | Kohut | 380/45 |
| 7,051,204 | B2 * | 5/2006 | Pitsos | 713/168 |
| 2004/0193882 | A1 * | 9/2004 | Singerle | 713/168 |
| 2005/0160297 | A1 * | 7/2005 | Ogawa | 713/202 |
| 2005/0289352 | A1 * | 12/2005 | Benjes | 713/182 |
| 2006/0018467 | A1 * | 1/2006 | Steinmetz | 380/54 |
| 2006/0031174 | A1 * | 2/2006 | Steinmetz | 705/67 |
| 2006/0129830 | A1 * | 6/2006 | Haller et al. | 713/183 |

FOREIGN PATENT DOCUMENTS

WO    WO 03/069490 A1    8/2003

OTHER PUBLICATIONS

Shigeo Akutsu, "SecureMatrix—The brand new password solution provided by secure matrix", Nov. 20, 2003, copyright 2003, Computer Systems Engineering Co., Ltd.*

* cited by examiner

*Primary Examiner*—Thanhnga B. Truong
*Assistant Examiner*—April Y Shan
(74) *Attorney, Agent, or Firm*—Stephen M. De Klerk; Blakely, Sokoloff, Taylor & Zafman

(57) ABSTRACT

Disclosed is a user authentication system, which is designed to present a presentation pattern to a user subject to authentication, and apply a one-time-password derivation rule serving as a password of the user to certain pattern elements included in the presentation pattern at specific positions so as to create a one-time password. An authentication server is operable to generate a pattern seed value adapted to be combined with a user ID so as to allow a presentation pattern to be uniquely determined, and transmit the generated pattern seed value to an authentication-requesting client. The authentication-requesting client is operable to display a presentation pattern created based on an entered user ID and the received pattern seed value and in accordance with a given pattern-element-sequence creation rule, so as to allow the user to enter therein a one-time password, and transmit the entered one-time password to the authentication server. The authentication server is operable to duplicate the presentation pattern so as to create a verification code, and compare between the received one-time password and the created verification code, so as to carry out user authentication. The present invention provides a matrix authentication scheme capable of reducing the risk of password leakage.

10 Claims, 10 Drawing Sheets

SYSTEM AND METHOD FOR USER AUTHENTICATION

CROSS-REFERENCE TO RELATED APPLICATIONS

The present patent application claims priority from Japanese Patent Application No. 2006-86603, filed on Mar. 27, 2006.

TECHNICAL FIELD

The present invention relates to a user authentication system, and more specifically to a user authentication system designed to arrange a plurality of pattern elements in a given pattern format so as to create a presentation pattern to be presented to a user subject to authentication, and apply a one-time-password derivation rule serving as a password of the user to certain ones of the pattern elements included in the presentation pattern at specific positions so as to create a one-time password.

BACKGROUND ART

In user authentication systems, a one-time password-based system using a single-use password usable only once for user authentication purpose has become popular as one scheme having higher security than fixed password-based schemes. The one-time password-based system includes a token-based scheme using a token for creating a one-time password in accordance with a one-time-password generation rule synchronous with an authentication server, and a challenge/response scheme designed such that an authentication server transmits to a client a so-called "challenge" which is a value to be varied every time, and the client returns to the authentication server a response created by applying a client's fixed password to the challenge in accordance with a given rule. While the token-based scheme has an advantage of being able to reliably identify a user who owns a token, it forces the user to carry around the token, and has problems about cost of the token and security in the event of loss of the token. In this respect, the challenge/response scheme offers the convenience of being not necessary to use a token. On the other hand, due to a process of generating a one-time password using a client's fixed password which is highly likely to be analogized, the challenge/response scheme involves problems about poor protection against stealing during a password input operation and the need for installing dedicated software to allow a client to generate a response.

Late years, a new user authentication system has been developed based on a so-called "matrix authentication" scheme to improve the above problems in the conventional challenge/response scheme, (see, for example, the following Patent Publication 1 and Non-Patent Publication 1). This matrix authentication scheme is designed to arrange a plurality of random numbers in a given pattern format so as to create a matrix-form presentation pattern to be presented to a user subject to authentication, and apply a one-time-password derivation rule serving as a password of the user to certain pattern elements (a part of the random numbers) included in the presentation pattern so as to create a one-time password. Specifically, the presentation pattern is shared in common between a server and a client. Then, instead of a direct comparison of password, the sever carries out user authentication by comparing between a one-time password created on the client side as a result of applying the one-time-password derivation rule or the user's password to the presentation pattern, and a verification code created on the server side as a result of applying the one-time-password derivation rule or the user's password to the presentation pattern. In the matrix authentication scheme, a one-time-password derivation rule serving as a password is information about respective positions of certain pattern elements to be selected on a matrix-form presentation pattern and a selection order of the certain pattern elements, and characterized in that it is easily storable in the form of an image and cannot be figured out as a specific password even if being stolen during a password input operation.

FIG. 9 is a block diagram showing a user authentication system 100 based on a typical conventional matrix authentication scheme. In this conventional matrix authentication scheme, information for creating a presentation pattern 191 is transmitted from an authentication server 101 to an authentication-requesting client 151 in the form of a pattern element sequence 190 (see, for example, the Patent Publication 1). Specifically, the user authentication system 100 generally comprises the authentication server 101 for carrying out user authentication, and the authentication-requesting client 151 serving as a terminal for allowing each user to request authentication. The authentication server 101 includes a one-time-password-derivation-rule storage section 102, user-ID receiving means 103, pattern generation means 104, pattern transmission means 105, verification-code creation means 106, one-time-password receiving means 107 and user authentication means 108. The authentication-requesting client 151 includes user-ID input means 152, user-ID transmission means 153, pattern receiving means 154, pattern display means 155, one-time-password input means 156 and one-time-password transmission means 157.

The authentication-requesting client 151 includes user-ID input means 152, user-ID transmission means 153, pattern receiving means 154, pattern display means 155, one-time-password input means 156 and one-time-password transmission means 157.

In the authentication server 101, the one-time-password-derivation-rule storage section 102 pre-stores respective user IDs 102a and one-time password rules 102b of users in associated relation with each other on a user-by-user basis. The user-ID receiving means 103 is operable to receive the user ID 181 of the user subject to authentication, from the authentication-requesting client 151. The pattern generation means 104 is operable, in accordance with a given generation rule, such as a pseudorandom-number generation rule, to generate a pattern element sequence 190 which is a sequence of pattern elements to be included in a matrix-form presentation pattern 191. The pattern transmission means 105 is operable to transmit the generated pattern element sequence 190 to the authentication-requesting client 151.

In the authentication-requesting client 151, the user-ID input means 152, such as a keyboard, allows the user subject to authentication to enter his/her own user ID 181 therefrom. The user-ID transmission means 153 is operable to transmit the entered user ID 181 to the authentication server 101. Thus, in the authentication server 101, the user-ID receiving means 103 receives the transmitted user ID 181. Then, in accordance with the given generation rule, the pattern generation means 104 generates a pattern element sequence 190 or a sequence of random numbers for forming a matrix-form presentation pattern 191. The pattern transmission means 105 transmits the generated pattern element sequence 190 to the authentication-requesting client 151. In the authentication-requesting client 151, the pattern receiving means 154 is operable to receive the transmitted pattern element sequence 190. The pattern display means 155 is operable to arrange the respective pattern elements included in the received pattern element sequence 190, in a given pattern format 191*p*, so as to create a presentation pattern 191, and display the presentation pattern 191 on a screen.

FIG. 10 is an explanatory conceptual diagram showing a process of creating a presentation pattern 191 in the conventional user authentication system 100. FIG. 10 shows a presentation pattern 191 as one example in which one-digit numerals of "0 (zero)" to "9" are used as pattern elements, and sixty four of the pattern elements are arranged, respectively, at element positions in a pattern format consisting of four 4×4 matrixes. In this example, the authentication server 101 is operable to generate, in accordance with a random-number generation algorithm, sixty four of the one-digit numerals which are pattern elements to be included in the presentation pattern 191, and then transmit a pattern element sequence 190 created by sequencing the generated pattern elements, to the authentication-requesting client 151. The authentication-requesting client 151 is operable to receive the pattern element sequence 190, and arrange the pattern elements included therein, respectively, at element positions on the given pattern format 191*p* (consisting of four 4×4 matrixes, in this example) in order in conformity to the order in pattern element sequence 190, so as to create the presentation pattern 191, and display the created presentation pattern 191 on the screen.

FIG. 7 is an explanatory conceptual diagram showing a process of entering a one-time password in the matrix authentication scheme. The user selects certain ones of the numerals displayed at given positions on the matrixes in order by applying the one-time-password derivation rule 102*b* of the user to the presentation pattern 191, and enters the selected numerals as a one-time password from the one-time-password input means 156. Further, a certain number of numerals may be additionally entered without being based on the presentation pattern 191. Specifically, a fixed password of the user may be included in the one-time password. These numerals are entered using a pointing device, such as a mouse or a touch panel, or a keyboard 196. The arrows and circles indicated by broken lines in FIG. 7 show that the one-time password based on the presentation pattern 191 is entered from the key board 196. Then, the one-time-password transmission means 157 is operable to transmit the entered one-time password 192 to the authentication server 101. In the authentication server 101, the one-time-password receiving means 107 is operable to receive the transmitted one-time password 192. The verification-code creation means 106 is operable to create a verification code as a result of applying the one-time-password derivation rule 102*b* associated with the received user ID 181, to certain pattern elements of a presentation pattern formed from the transmitted pattern sequence 190 on the server side. The user authentication means 108 is operable to compare the received one-time password 192 with the created verification code, and successfully authenticate the user if they are identical to one another.

[Parent Publication 1] Pamphlet of International Publication WO 03/069490 (lines 2 to 3, page 10)

[Non-Parent Publication 1] Taizu Ohnishi & Associates IT Conference,"Learn from Base Technologies -Mobile Management-", IT SELECT, Mediaselect Inc., Feb. 01, 2002, pp 56 to 60

In the conventional matrix authentication scheme, a pattern element sequence, or a sequence of pattern elements for forming a matrix-form presentation pattern, is transmitted from the authentication server to the authentication-requesting client. In this process, if information about the pattern element sequence is acquired by a malicious third party, through means, for example, of network tapping, the tapped information will bring about the possibility of estimating the presentation pattern based thereon. Only one tapping of a one-time password as a response to this presentation pattern is not enough to figure out the association between the selected pattern elements of the one-time password and the pattern elements of the presentation pattern in a one-to-one correspondence with each other, and therefore a one-time-password derivation rule or a password is never figured out as a specific one. However, if a pattern element sequence and a one-time password corresponding thereto are tapped plural times, respective positions of certain pattern elements to be selected as a one-time password from a presentation pattern can be narrowed down along with increase in tapped information, and finally the one-time-password derivation rule will be undesirably specified. Thus, there is a strong need for a matrix authentication scheme capable of reducing the risk of password leakage arising from the above network tapping by third parties.

DISCLOSURE OF THE INVENTION

In view of the above problem, the present invention provides a user authentication system designed to arrange a plurality of pattern elements in a given pattern format so as to create a presentation pattern to be presented to a user subject to authentication, and apply a one-time-password derivation rule serving as a password of the user to certain ones of the pattern elements included in the presentation pattern at specific positions so as to create a one-time password. The user authentication system comprises an authentication server and an authentication-requesting client. The authentication server is operable to generate, in accordance with a given generation rule, a pattern seed value adapted to be combined with a user ID so as to allow a presentation pattern to be uniquely determined, and transmit the generated pattern seed value to the authentication-requesting client. The authentication-requesting client is operable to display a presentation pattern created based on an entered user ID and the received pattern seed value and in accordance with a given pattern-element-sequence creation rule, so as to allow the user to enter therein a one-time password created as a result of applying the one-time-password derivation rule to certain pattern elements included in the displayed presentation pattern, and transmit the entered one-time password to the authentication server. The authentication server is operable to create a verification code as a result of applying the one-time-password derivation rule corresponding to the received user ID, to certain pattern elements included in a presentation pattern formed from a pattern element sequence which is created based on the received user ID and the transmitted pattern seed value and in accordance with the given pattern-element-sequence creation rule, and compare between the received one-time password and the created verification code, so as to carry out user authentication.

In the user authentication system of the present invention, the given pattern-element-sequence creation rule may be designed to apply a symmetric-key encryption algorithm using a key consisting of a value based on the user ID and the corresponding pattern seed value, to a given initial character sequence, so as to allow the pattern element sequence to be created based on a result of the algorithm.

In the user authentication system of the present invention, the given pattern-element-sequence creation rule may be designed to apply a hash function algorithm to a value based on the user ID and the corresponding pattern seed value, so as to allow the pattern element sequence to be created based on a result of the algorithm.

The user authentication system of the present invention may be designed such that the authentication-requesting client transmits a hashed one-time password to the authentication server, and the authentication server carries out user authentication using a hashed verification code.

In the user authentication system of the present invention, the one-time-password derivation rule may consist of a combination of respective positions of certain ones to be selected from the pattern elements included in the presentation pattern, and a selection order of the certain pattern elements. Alternatively, the one-time-password derivation rule may consist of a combination of: respective positions of certain ones to be selected from the pattern elements included in the presentation pattern; one or more characters to be entered without being based on the presentation pattern; and a selection or input order of the certain pattern elements and the characters.

In the user authentication system of the present invention, the pattern elements to be included in the presentation pattern may be selected from ten numerals of 0 (zero) to 9 and a symbol. Alternatively, the pattern elements to be included in the presentation pattern may be selected from ten numerals of 0 (zero) to 9.

In the user authentication system of the present invention, the given pattern format for use in arranging the plurality of pattern elements to create the presentation pattern may include a matrix having a number m of matrix elements in height and a number n of matrix elements in width to form a rectangular shape in its entirety.

In the inventions described above or set forth in appended claims, each of the terms "server" and "client" is not intended to express a device, apparatus or system having a specific configuration or function, but to express a device, apparatus or system having a typical function. Further, a function of a single component or claim-element may be achieved by two or more physical means, and a function of two or more components or claim-elements may be achieved by a single physical means. In the appended claims, a system claim may be recognized as a method or process claim defined such that respective functions of claim elements in the system claim are sequentially executed, and the opposite is true. It is understood that the steps defined in the method claim are not necessarily executed in order of description but may be executed in any suitable order allowing an intended function to be achieved in their entirety. The system and method of the present invention may be designed using a program capable of partly or entirely achieving the intended function in cooperation with given hardware, or a recording medium having the program recorded thereon.

As above, the user authentication system of the present invention is designed to present a presentation pattern to a user subject to authentication, and apply a one-time-password derivation rule serving as a password of the user to certain pattern elements included in the presentation pattern at specific positions so as to create a one-time password. The authentication server is operable to generate a pattern seed value adapted to be combined with a user ID so as to allow a presentation pattern to be uniquely determined, and transmit the generated pattern seed value to the authentication-requesting client. The authentication-requesting client is operable to display a presentation pattern created based on an entered user ID and the received pattern seed value and in accordance with a given pattern-element-sequence creation rule, so as to allow the user to enter therein a one-time password, and transmit the entered one-time password to the authentication server. The authentication server is operable to duplicate the presentation pattern so as to create a verification code, and compare between the received one-time password and the created verification code, so as to carry out user authentication. Thus, if the pattern seed value and the one-time password are acquired by a malicious third party, through means of network tapping etc., the pattern seed value never allows the presentation pattern to be duplicated based thereon, unless the pattern-element-sequence creation rule and the user ID are leaked, so as to effectively preclude the user's password or the one-time-password derivation rule from being specified based on the one-time password.

In the user authentication system of the present invention, the given pattern-element-sequence creation rule may be designed to apply a symmetric-key encryption algorithm using a key consisting of a value based on the user ID and the corresponding pattern seed value, to a given initial character sequence, so as to allow the pattern element sequence to be created based on a result of the algorithm. This provides an effect of practically precluding the presentation pattern from being estimated based on the pattern seed value.

In the user authentication system of the present invention, the given pattern-element-sequence creation rule may be designed to apply a hash function algorithm to a value based on the user ID and the corresponding pattern seed value, so as to allow the pattern element sequence to be created based on a result of the algorithm. This also provides an effect of practically precluding the presentation pattern from being estimated based on the pattern seed value.

BEST MODE FOR CARRYING OUT THE INVENTION

[User Authentication Process of the Present Invention]

Figure 1:
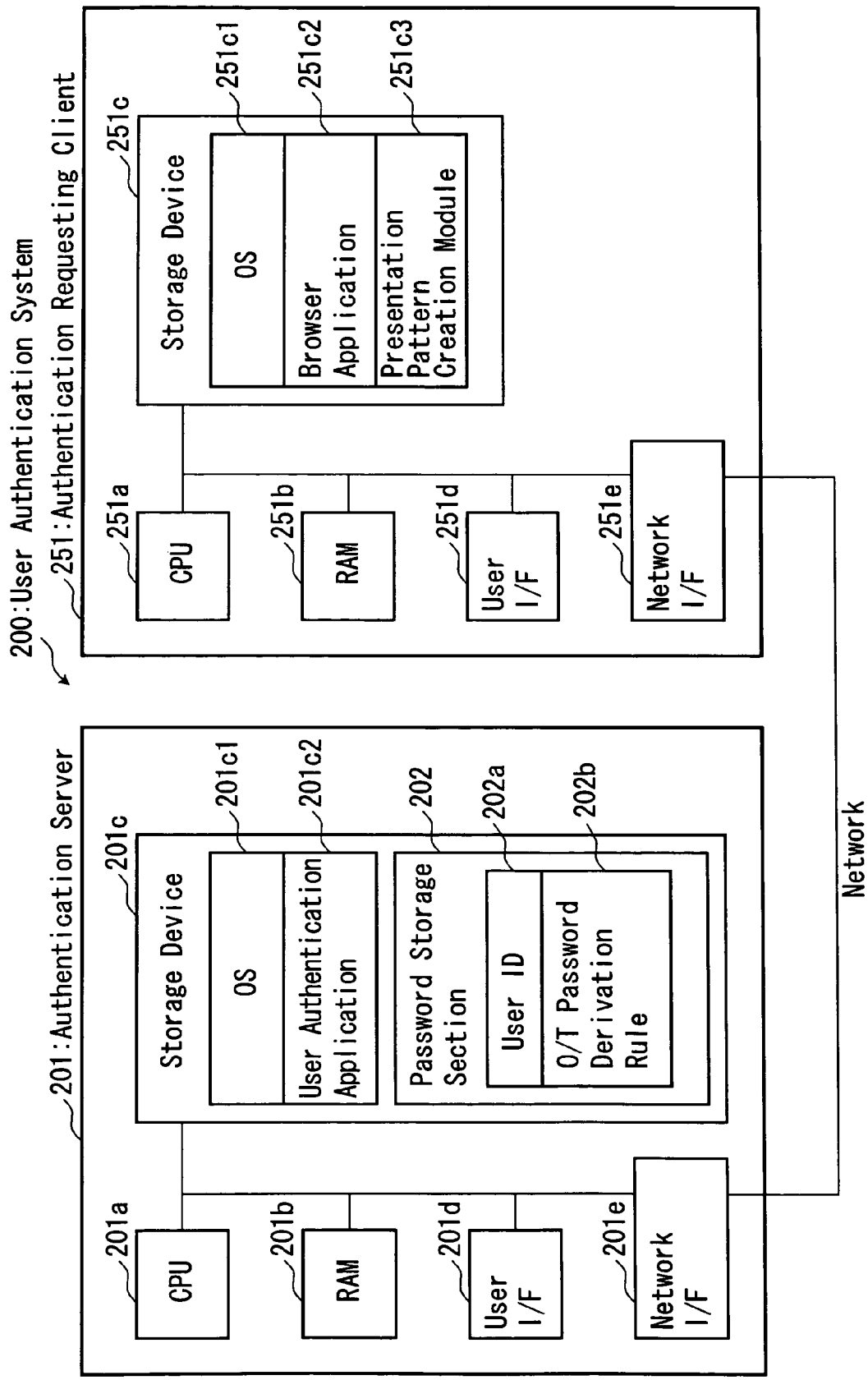
FIG. 1 is a block diagram showing a hardware configuration of a user authentication system 200 according to one embodiment of the present invention.
Figure 2:
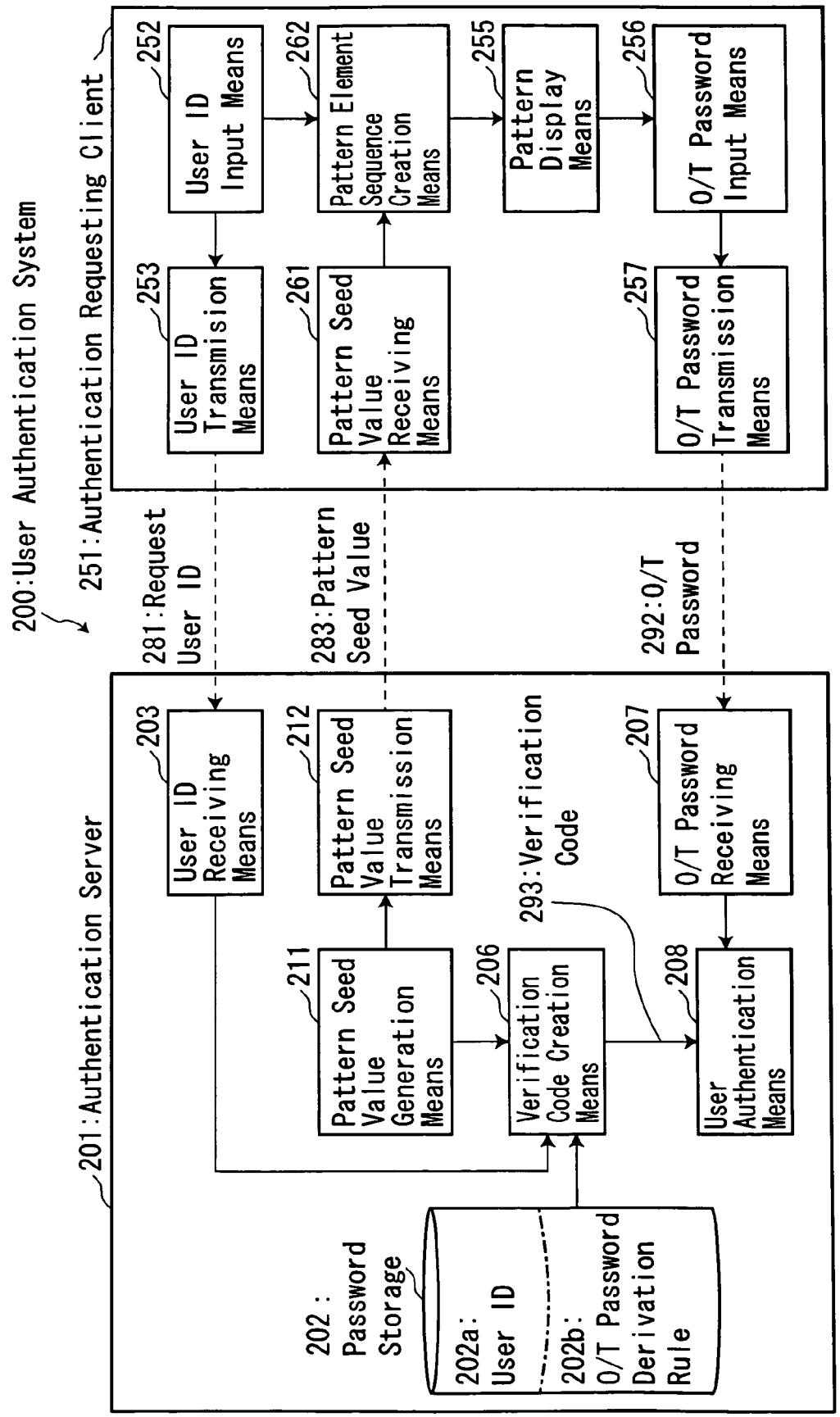
FIG. 2 is a functional block diagram showing the user authentication system 200.
Figure 3:
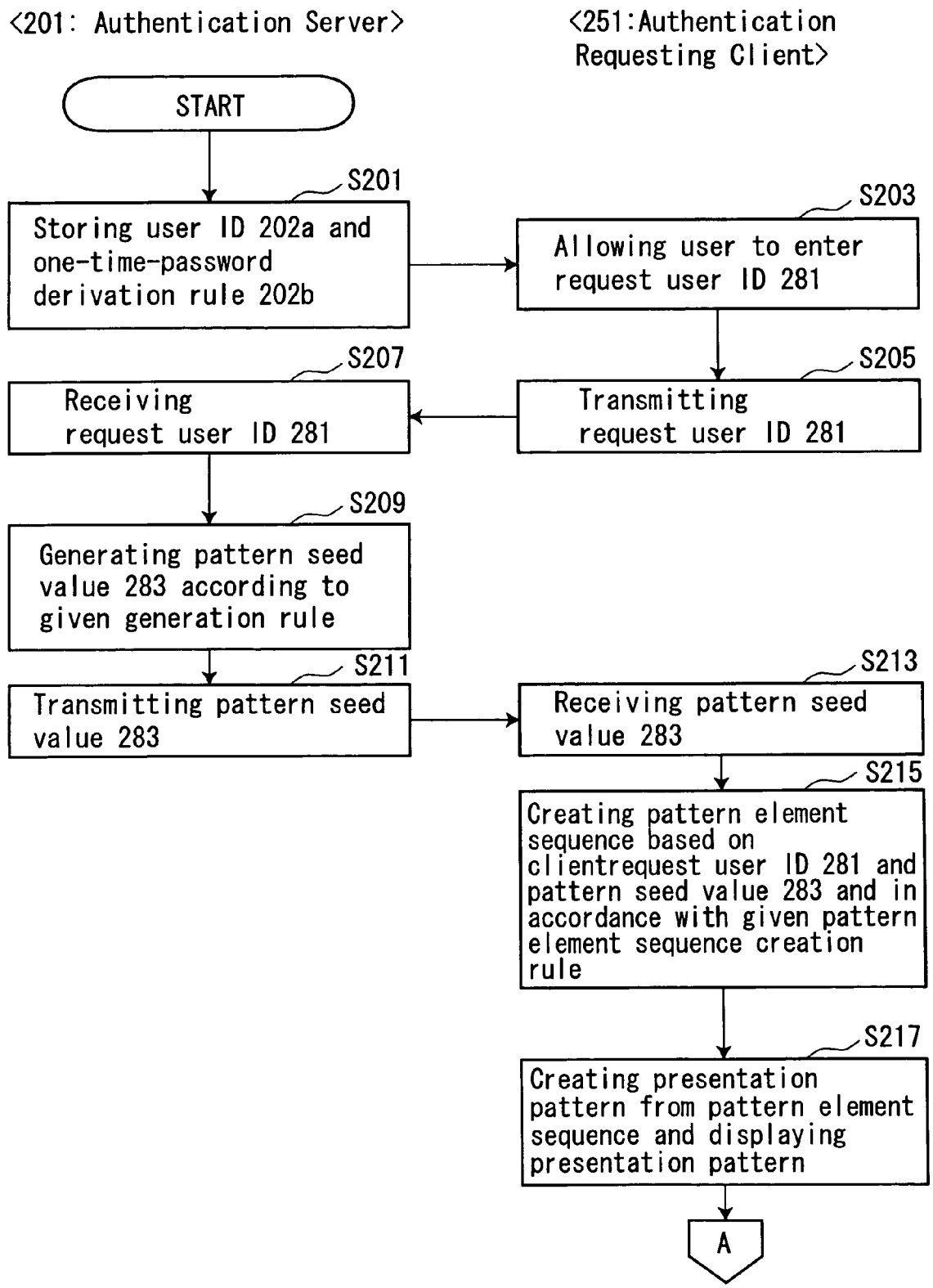
FIG. 3 is a flowchart showing an operation of the user authentication system 200.
Figure 4:
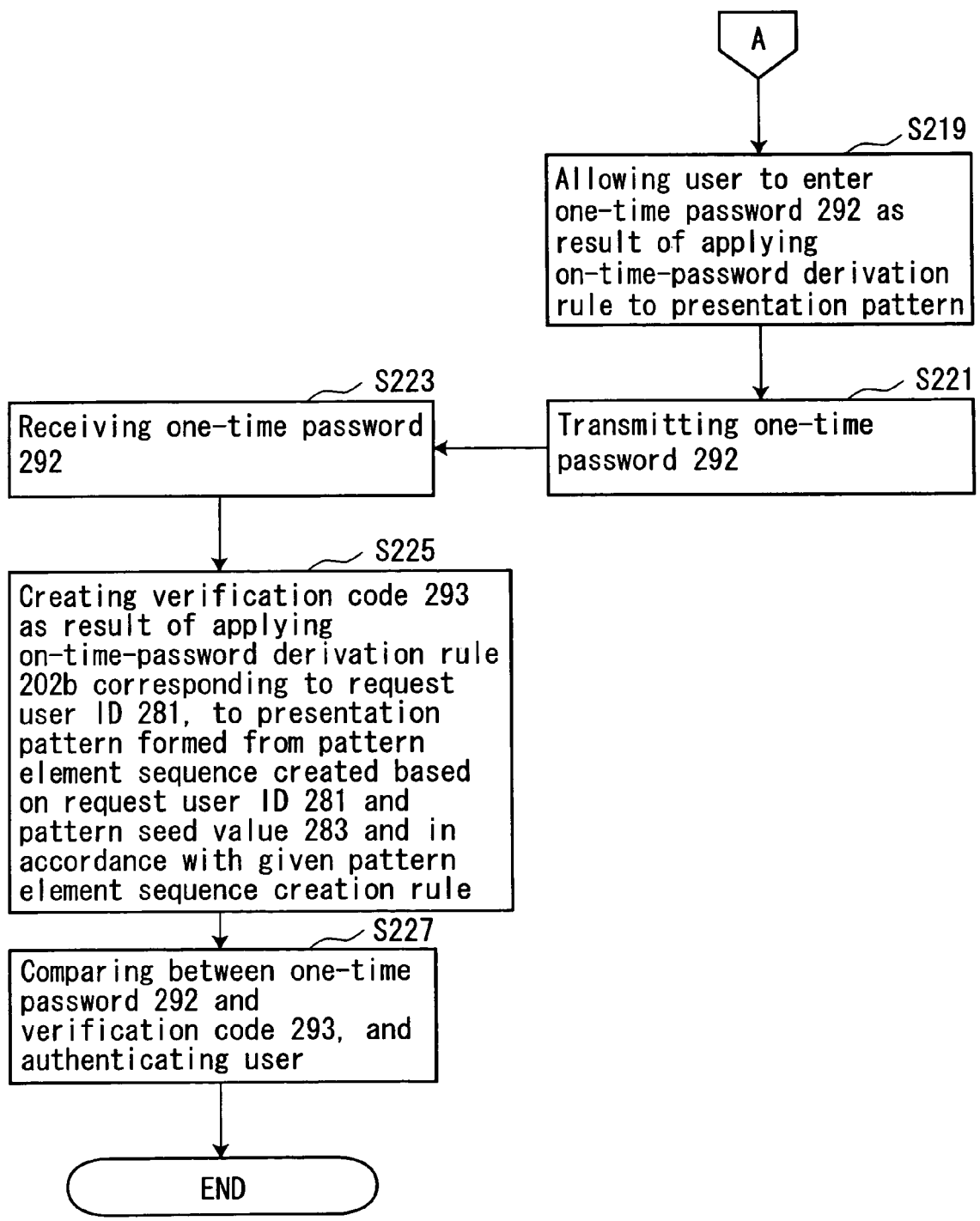
FIG. 4 is a flowchart showing an operation of the user authentication system 200, which is continued from the flowchart in FIG. 3.

With reference to the drawings, a user authentication system 200 according to one embodiment of the present invention will now be described. In the figures, a component or element of the user authentication system 200 corresponding to that of the aforementioned conventional user authentication system 100 is defined by a reference numeral having the same lower two digits. FIG. 1 is a block diagram showing a hardware configuration of the user authentication system 200, and FIG. 2 is a functional block diagram showing the user authentication system 200. FIGS. 3 and 4 are flowcharts showing an operation of the user authentication system 200. Firstly, an outline of a user authentication process of the present invention will be described below. The user authentication process of the present invention is based on the aforementioned matrix authentication scheme which is one type of challenge/response authentication schemes. In the user authentication process of the present invention, an authentication-requesting client 251 is operable to arrange a plurality of pattern elements in a given pattern format so as to create a presentation pattern 291 to be presented to a user subject to authentication, and the user applies a one-time-password derivation rule 202b serving as a password of the user to certain ones of the pattern elements included in the presentation pattern 291 so as to create a one-time password 292. An authentication server 201 is operable to generate a pattern seed value 283 which is information necessary for the authentication-requesting client 251 to create the presentation pattern 291 to be presented to the user, and transmit the generated pattern seed value 283 to the authentication-requesting client 251. The above presentation pattern 291 is created based on the pattern seed value 283 and a user ID of the user. Then, the authentication-requesting client 251 is operable to transmit the one-time password 292 entered therein to the authentication server 201, and the authentication server 201 is operable to duplicate the presentation pattern based on the user ID of the user and the transmitted pattern seed value 283, and apply the one-time-password derivation rule 202b serving as a password of the user to the duplicated presentation pattern so as to create a verification code 293. Then, the authentication server 201 is operable to compare the verification code 293 with the one-time password 292 transmitted from the authentication-requesting client 251, and successfully authenticate the user if they are identical to one another.

[Presentation Pattern and Pattern Elements]

The term "presentation pattern" means a set of pattern elements arranged in a given pattern format. While the given pattern format is typically a matrix having a number m of matrix elements in height and a number n of matrix elements in width to form a rectangular shape in its entirety, or a plurality of the matrixes, it may be any other suitable pattern. In this specification, an authentication scheme using a presentation pattern arranged in a pattern format other than the typical matrix pattern will also be referred to as "matrix authentication scheme". Preferably, the give pattern format is formed as an orderly pattern or an impressive pattern easily remaining in user's memory to allow a user to easily remember the one-time-password derivation rule 202b serving as a password of the user.

The term "pattern element" means an element to be arranged at a given position in the given patter format so as to constitute a presentation pattern. Preferably, the pattern element is selected from one-digit numerals of "0 (zero)" to "9". Alternatively, the pattern element may be any other suitable character, such as alphabet or symbol. In particular, the symbol is preferably "+", "−", "*", "=", "_", "!", "?", "#", "$" or "&" which is assigned to a keyboard for a personal computer (PC). The character may include a figure, such as graphic, illustration or photograph. Preferably, a plurality of the same pattern elements are used in a single presentation pattern. In this case, there is a many-to-one correspondence between a one-time-password derivation rule 202b serving as a password of a user and a one-time password 292 created as a result of applying the one-time-password derivation rule 202b to a presentation pattern, and therefore a one-way encryption algorithm is automatically performed during input of the one-time password 292. That is, a similar algorithm to a hash function algorithm is automatically performed during input of the one-time password 292. Thus, even if the presentation pattern has already been specified, the one-time-password derivation rule 202b cannot be specified based on only a single one-time password 292.

Figure 7:
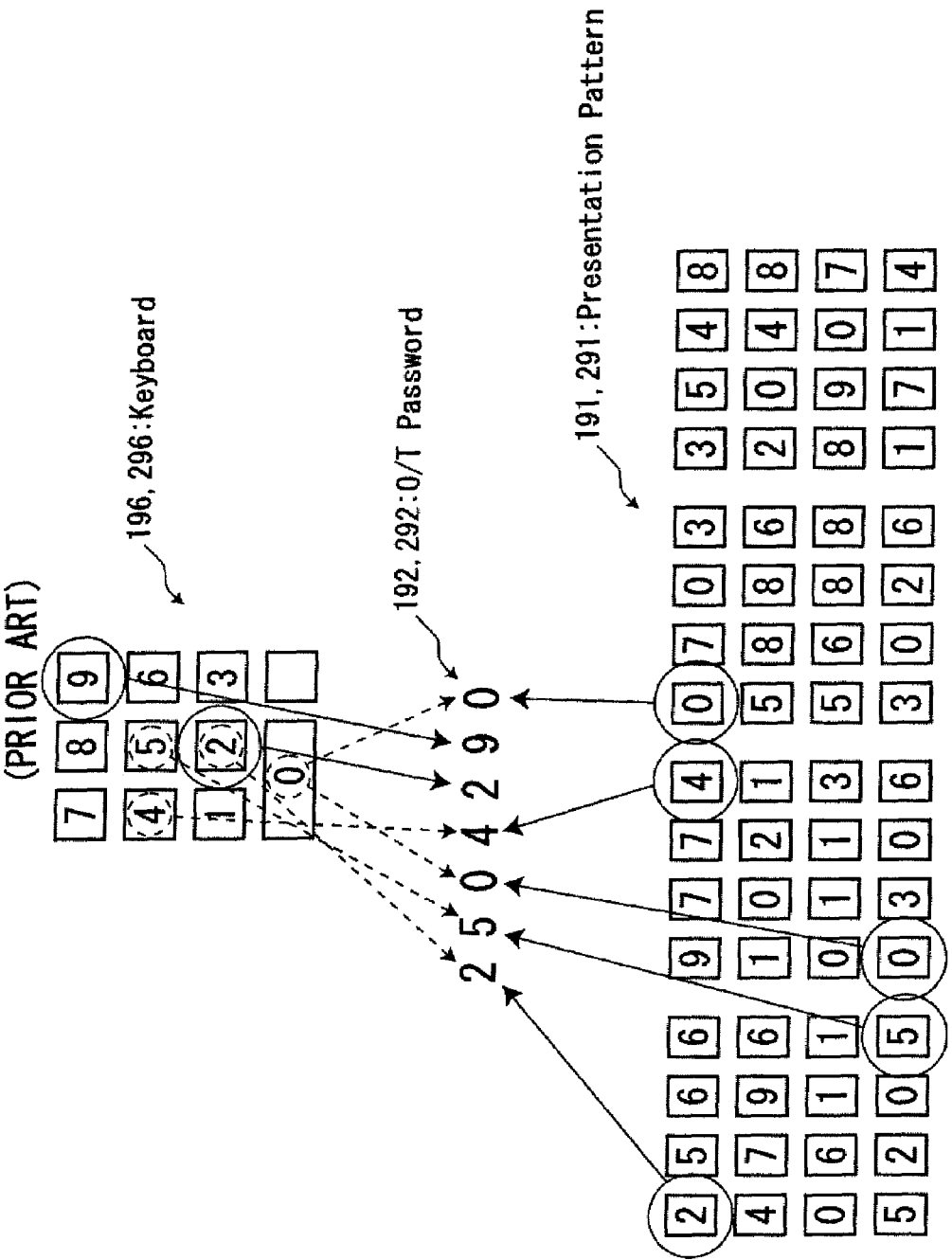
FIG. 7 is an explanatory conceptual diagram showing a process of entering a one-time password in the matrix authentication scheme.

In this embodiment, as shown in FIG. 7, one-digit numerals of "0 (zero)" to "9" are used as pattern elements, and a presentation pattern 291 is formed of sixty four of the pattern elements arranged in a given pattern format 291p consisting of four 4×4 matrixes. In an authentication-requesting client having a display screen with a small area, such as a portable phone, a presentation pattern may be formed using a reduced number (e.g. three) of 4×4 matrixes.

[Pattern Element Sequence]

A pattern element sequence 290 is data representing the content of a plurality of pattern elements to be arranged in the given pattern format 291p so as to create a presentation pattern 291. Typically, the pattern element sequence 290 is formed by arranging all pattern elements in order to be included in the presentation pattern 291. The pattern element sequence 290 is created in advance of the creation of the presentation pattern 291. It should be noted that a pattern element sequence 290 is not necessarily a single character sequence formed by arranging a plurality of pattern elements in order, but means data including information about all pattern elements to be included in a single presentation pattern 291. That is, as long as a plurality of pattern elements included in a pattern element sequence 290 are arranged therein in association, respectively, with positions in a presentation pattern, the order of the pattern elements included in the pattern element sequence 290 may be freely determined. Further, the pattern element sequence 290 may be divided into a plurality of data. In the user authentication system 200 according to this embodiment, a pattern element sequence 290 is created in the authentication-requesting client 251, and used only for creating a presentation pattern 291 in the authentication-requesting client 251 without being transmitted to the authentication server 201 via a network. In contrast, a pattern element sequence 190 in the conventional user authentication system 100 is generated in the authentication server 101, and then transmitted from the authentication server 101 to the authentication-requesting client 151 via a network.

[One-Time-Password Derivation Rule]

A one-time-password derivation rule 202b is a rule to be applied to certain pattern elements included in a presentation pattern 291 at specific positions so as to create a one-time password 292, and is data serving as a password of a user. The "rule to be applied to certain pattern elements" means a rule for selecting certain pattern elements at specific positions in a specific order. In this embodiment, a one-time-password derivation rule 202b is information consisting of a combination of respective positions of certain ones to be selected from a plurality of pattern elements included in a presentation pattern 291, and a selection order of the certain pattern elements. The one-time-password derivation rule 202b may include character information, such as numeral, to be entered without being based on the presentation pattern 291, 391. In this case, the one-time-password derivation rule 202b is information consisting of a combination of: respective positions of certain ones to be selected from the pattern elements included in the presentation pattern 291; one or more characters to be entered without being based on the presentation patter 291; and a selection or input order of the certain pattern elements and the characters.

Figure 6:
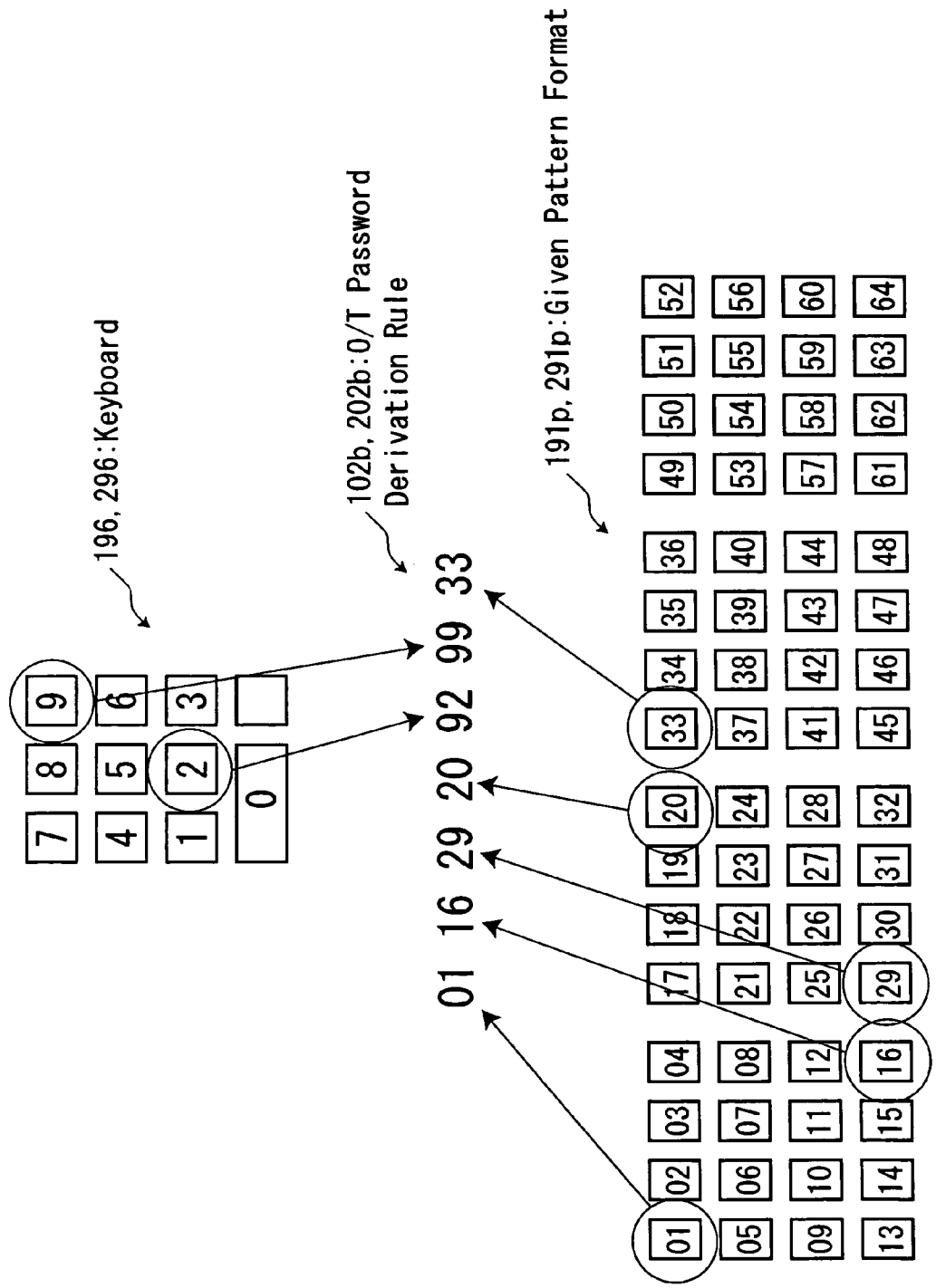
FIG. 6 is an explanatory conceptual diagram showing a one-time-password derivation rule in a matrix authentication scheme.

FIG. 6 shows the configuration of a one-time password created according to a typical one-time-password derivation rule 202b. In this embodiment, the one-time-password derivation rule 202b is applied to a presentation pattern 291 formed by arranging a plurality of pattern elements using one-digit numerals of "0 (zero)" to "9", in the given pattern format 291p consisting of four 4×4 matrixes. In FIG. 6, respective positions of the pattern elements in the given pattern format 291p are distinctively indicated by sixty four numerals of 01 to 64. When the presentation pattern 291 is presented to a user subject to authentication, either one of the one-digit numerals of "0" to "9" will be displayed at each of the positions of the pattern elements in the given pattern format 291p.

Preferably, in addition to numerals entered based on the presentation pattern 291, one or more numerals are entered without being based on the presentation pattern 291 to create a one-time password 292. The number of pattern elements included in the presentation pattern 291 is sixty four. Thus, each one selected from the sixty four pattern elements included in the presentation pattern 291 is indicated by a corresponding one of the two-digit numeral of 01 to 64 assigned, respectively, to the sixty four pattern elements. Further, each of the numerals to be entered without being based on the presentation pattern 291 is indicated by a two-digit numeral in which "9" is assigned as the initial digit to represent the above feature of the numeral, and one-digit numeral to be entered is assigned as the last digit. As shown in FIG. 6, certain ones selected from the pattern elements of the presentation pattern 291 at specific positions are entered as the first four numerals of the one-time password 292. The numerals "01","16","29","20" representing the respective positions of the pattern elements selected according to the one-time-password derivation rule 202b are arranged in this order as a corresponding part of the one-time password. The selected pattern elements are entered using a keyboard 296, 396 or a pointing device. The subsequent two numerals of the one-time password 292 are entered without being based on the presentation pattern 291 as a fixed password element, using the key board 296 or the like. The numerals "92", "99" each having the numeral "9" representing the direct input and the entered numeral "2" or "9" added thereto according to the one-time-password derivation rule 202b are subsequently arranged in this order as a corresponding part of the one-time password. Then, certain one selected from the pattern elements of the presentation pattern 291 at a specific position is entered as the subsequent last one numeral of the one-time password 292. The numeral "33" representing the position of the pattern element selected according to the one-time-password derivation rule 202b is subsequently arranged as a corresponding part of the one-time password, and the one-time password is terminated. The one-time-password derivation rule 202b may be designed to further add an end mark uniquely specifying the termination point of the one-time password, such as a numeral "00", to the tail end of the one-time password, or to associate a numerical value representing the entire length of the one-time password, with the one-time password.

[Pattern Seed Value]

A pattern seed value 283 is adapted to be combined with a request-user ID 281 so as to uniquely determine pattern elements to be included in a single presentation pattern 291, and is a constant generated in accordance with a given generation rule to fall within a given range. The authentication server 201 can verify whether a one-time password entered in the authentication-requesting client 251 is correct, only if the authentication server 201 has information about a presentation pattern presented in the authentication-requesting client 251. As mentioned above, in the conventional user authentication system 100, pattern elements included in a presentation pattern 190 are generated in the authentication server 101, and a pattern element sequence created by arranging the generated pattern elements is transmitted from the authentication server 101 to the authentication-requesting client 151. In this process, if information about the pattern element sequence is acquired by a malicious third party, through means, for example, of network tapping, the tapped information will bring about the possibility of estimating the presentation pattern based thereon. Further, the authentication server 101 can verify a one-time password 192 only if a presentation pattern 191 is shared in common between the authentication server 101 and the authentication-requesting client 151.

In order to meet such contradictory requirements, it is contemplated to transmit presentation-pattern specifying information which is able to uniquely determine a presentation pattern 291 but not formed as a pattern element sequence 290 itself, from the authentication server 201 to the authentication-requesting client 251. Then, the authentication-requesting client 251 will create the presentation pattern 291 based on the received presentation-pattern specifying information and in accordance with a given rule. For example, a hash function algorithm may be used as the given rule. In this case, a pattern element sequence 290 itself is not transmitted via a network to provide enhanced security. However, even in this scheme, if an algorithm installed on the authentication-requesting client 251 to create the presentation pattern 291 from the presentation-pattern specifying information is analyzed by a malicious third party, and the presentation-pattern specifying information is acquired by the malicious third party, through means, for example, of network tapping, the tapped information will bring about the possibility of estimating the presentation pattern 291 based thereon. Therefore, the user authentication system using the above presentation-pattern specifying information is not enough in terms of security.

In the present invention, instead of transmitting a pattern element sequence 291 itself, a pattern seed value 283 is transmitted from the authentication server 201 to the authentication-requesting client 251. This pattern seed value 283 is adapted to be combined with a request-user ID 281 entered by a user in the authentication-requesting client 251, so as to allow a presentation pattern 291 to be uniquely determined. That is, while the pattern seed value 283 cannot uniquely determine the presentation pattern 291 by itself, it can be combined with the request-user ID 281 essentially entered by the user in the authentication-requesting client 251, to uniquely determine the presentation pattern 291. Thus, even if the pattern seed value 283 transmitted to the authentication-requesting client 251 is acquired by a malicious third party, through means, for example, of network tapping, it is impossible to estimate the presentation pattern 291 based thereon, because the pattern seed value 283 does not represent the presentation pattern 291 itself. In addition, even if an algorithm for creating the presentation pattern 291 is analyzed based on the request-user ID 281 and the pattern seed value 283, it is impossible to estimate the presentation pattern 291 unless the request-user ID 281 is known. The present invention employing the above scheme can make it significantly difficult to estimate a presentation pattern 291 to be presented in the authentication-requesting client 251, and thereby can provide enhanced security.

Typically, a pattern seed value 283 is a numerical value generated in accordance with a random-number generation algorithm to fall within a given range. Instead of the random-number generation algorithm, the pattern seed value 283 may be generated in accordance with any other suitable rule for generating a numerical value within the given range, such as a count-up or count-down operation for sequentially adding or subtracting a given value to or from a given initial value.

[One-Time Password]

A one-time password 292 is a single-use password to be created/entered by a user subject to authentication, through an operation of applying a one-time-password derivation rule 202b of the user to a presentation pattern 291. FIG. 7 is an explanatory conceptual diagram showing a process of entering a one-time password in the matrix authentication scheme. A one-time-password derivation rule 202b used in FIG. 7 is the same as that shown in FIG. 6. The user selects certain ones of a plurality of pattern elements included in a presentation pattern 291 at given positions and enters one or more given numerals without being based on the presentation pattern 291, in a given order according to the one-time-password derivation rule of the user, to create/enter "2504290" as a one-time password 292.

[Hardware Configuration of User Authentication System 200]

The configuration of the user authentication system 200 will be described below. FIG. 1 is a block diagram showing a hardware configuration of the user authentication system 200 according to this embodiment. Referring to FIG. 1, the user authentication system 200 generally comprises the authentication server 201 and the authentication-requesting client 251. The authentication server 201 includes a CPU 201a, a RAM 201b, a storage device 201c, a user interface (user I/F) 201d, and a network interface (network I/F) 201e. The storage device 201c has a storage area which stores an OS 201c1 and a user-authentication application 201c2 and includes a password storage section 202. The password storage section 202 stores respective user IDs 202a and one-time-password derivation rules 202b of a plurality of users. The authentication-requesting client 251 includes a CPU 251a, a RAM 251b, a storage device 251c, a user interface (user I/F) 251d, and a network interface (network I/F) 251e. The storage device 251c has a storage area which stores an OS 251c1, a user-authentication application 251c2 and a presentation-pattern creation module 251c3.

In the user authentication system 200, the authentication server 201 is provided as a means to perform user authentication in response to a user authentication request from the authentication-requesting client 251. For example, the authentication server 201 is composed of a server or a personal computer having the OS 201c1 and the user-authentication application 201c2 installed thereon. The authentication server 201 may be composed of a hardware for providing user authentication in a gateway apparatus, such as SSL-VPN gateway, for providing a virtual leased-line network on the Internet. The CPU 201a is a processor adapted to execute the user-authentication application 201c2 or other application on the OS 201c1 so as to perform a processing of information about user authentication. The RAM 201b is a memory for providing a memory space allowing a software stored on the storage device 201c to be read thereon and a work area required when the read software is executed by the CPU 201a. The storage device 201c is provided as a means to store/manage information, such as software and data, and typically composed of a hard disk drive. Preferably, the storage device 201c stores a file of programs of the OS 201c1 and the user-authentication application 201c2, and these programs will be read on the RAM 201b and executed. As to the programs of the OS 201c1 and the user-authentication application 201c2, the storage device 201c may be designed to store them on a ROM. In this case, the ROM serves as a firmware as well as a program execution element, such as the CPU 201a. The user I/F 201d is provided as a means to allow data to be input/output from/to a user therethrough, and typically composed of: input means consisting of a keyboard 296 or a pointing device, such as a mouse; output means, such as a display, for displaying information on a screen; and a hardware I/F between the input and output means. The keyboard 296 may be any suitable type capable of entering pattern elements for forming a one-time password therethrough, such as a numeric keypad or a standard full keyboard. The network I/F 201e is adapted to be connected to a network so as to allow information to be input/output from/to the network.

The OS 201c1 and the user-authentication application 201c2 may be combined together in the form of an integrated program. For example, the OS 251c1 may include the functions of the user-authentication application 201c2. Alternatively, the user-authentication application 201c2 may be incorporated in another application. Further, each of these OSs may be divided into a plurality of programs.

The authentication server 201 is connected to the authentication-requesting client 251 via a network. Preferably, the network is the internet or an intranet operable in accordance with a TCP/IP-based protocol. When the authentication-requesting client 251 in an intranet operates based on a client Windows® OS, the network may be a Windows® domain network operable in accordance with a TCP/IP-based protocol. While the OS in this specification is described by taking Windows® as an example, any other suitable OS, such as Mac OS®, Linux® or Unix®, may be used.

The authentication process of the present invention may be implemented in at least the following two modes. One of the modes is an authentication for authorizing a user to use a Web service when the user connects the authentication-requesting client 251 to the Web service on the Web and uses contents, a SSL-VPN service or an application on the Web via a Web browser. In this mode, the authentication server 201 may be typically a Web server which is disposed on a network, such as the Internet or an intranet, to provide a Web page for user authentication to the authentication-requesting client 251 accessing via the network and transmit/receive data about user authentication through the Web page, or may be an apparatus designed to perform an authentication/accounting management in cooperation with a RADIUS server and provide a virtual leased-line network, such as SSL-VPN gateway, on the Internet.

The other mode is an authentication for authorizing a user to logon to a Windows® domain network as with the authentication server 201 when the user accesses the network as a proper network user, using the authentication-requesting client 251. In this mode, the authentication server 201 is typically designed to provide a resource for authentication, on a network, and operable to perform user authentication when the user issues an authentication request for logon to the Windows® domain network using the authentication-requesting client 251, and inform the authentication result to a domain controller for managing authorization of network users of the Windows® domain network.

The OS 201c1 is an operating system closely related to hardware of the authentication server 201 and adapted to perform a fundamental information processing. The user-authentication application 201c2 is an application software for user authentication which operates on the OS 201c1. In the authentication server 201 composed of a Web server, the user-authentication application 201c2 is typically a Web server program for providing a Web page or resource for authentication on the Web of the Internet or an intranet. The password storage section 202 is typically a certain area of a hard disk drive, and data is preferably stored on the password storage section 202 in the form of an encrypted file. The user ID 202a is data for uniquely identifying each user. Any type of character sequence may be used as the user ID 202a. As mentioned above, the one-time-password derivation rule 202b is a rule to be applied to certain pattern elements included in a presentation pattern 291 at specific positions so as to create a one-time password 292, and is data serving as a password of a user.

In the user authentication system 200, the authentication-requesting client 251 is provided as a means to allow a user to issue an authentication request to the authentication server 201. The authentication-requesting client 251 is a terminal having the OS 251c1, the browser application 251c2 and the presentation-pattern creation module 251c3 which are installed thereon. Specifically, the authentication-requesting client 251 is composed of a PC, a portable phone or a personal digital assistant (PDA). The CPU 251a is a processor adapted to execute the browser application 251c2, the presentation-pattern creation module 251c3 or other application on the OS 251c1 so as to perform a processing of information about user authentication. The RAM 251b is a memory for providing a memory space allowing a software stored on the storage device 251c to be read thereon and a work area required when the read software is executed by the CPU 251a. The storage device 251c is provided as a means to store/manage information, such as software and data, and typically composed of a hard disk drive. Preferably, the storage device 251c stores a file of programs of the OS 251c1, the browser application 251c2 and the presentation-pattern creation module 251c3, and these programs will be read on the RAM 251b and executed. As to the OS 251c1, the browser application 251c2 and the presentation-pattern creation module 251c3 the storage device 201c may be designed to store their programs on a ROM. In this case, the ROM serves as a firmware as well as a program execution element, such as the CPU 251a. The user I/F 251d is provided as a means to allow data to be input/output from/to a user therethrough. Although not shown, the user I/F 251d is typically composed of: input means consisting of a keyboard 296 or a pointing device, such as a mouse, a track ball or a touch panel; output means, such as a display, for displaying information on a screen; and a hardware I/F between the input and output means. The network I/F 251e is adapted to be connected to a network so as to allow information to be input/output from/to the network.

The OS 251c1, the browser application 251c2 and the presentation-pattern creation module 251c3 may be partially or entirely combined together in the form of an integrated program. For example, the browser application 251c2 may include the functions of the presentation-pattern creation module 251c3. Alternatively, OS 251c1 may include the functions of the browser application 251c2 and the presentation-pattern creation module 251c3. Further, the browser application 251c2 and/or the presentation-pattern creation module 251c3 may be incorporated in another application. Further, each of them may be divided into a plurality of programs.

The OS 251c1 is an operating system closely related to hardware of the authentication-requesting client 251 and adapted to perform a fundamental information processing and serve as a fundamental program depending on the hardware of the authentication-requesting client 251. The OS 251c1 may be configured as a firmware having an architecture similar to a platform. The browser application 251c2 is an application software which operates on the OS 251c1 to access information provided on a network so as to display the information, and achieve a browser function for allowing a user to enter data therethrough. Typically, the browser application 251c2 is composed of a Web browser application for accessing a Web page on the Internet or an intranet. It is understood that the browser application 251c2 is not limited to the Web browser application, but may be any other suitable application capable of accessing a user authentication screen page provided on a network by the server. The browser application 251c2 may be configured as a firmware having an architecture similar to a platform for providing an API for displaying a screen page when another application performs authentication. The presentation-pattern creation module 251c3 is a program to be incorporated in the browser application 251c2 and executed to create a presentation pattern and display the created presentation pattern on a browser. In the authentication-requesting client 251 composed of a PC, the presentation-pattern creation module 251c3 is typically configured based on Java® applet, Active X® or Flash®. Even if the authentication-requesting client 251 is composed of a portable phone or a PDA, there is a high possibility that a module can be incorporated in the browser application 251c2 in the near future, and the presentation-pattern creation module 251c3 will serve as such a module. The presentation-pattern creation module 251c3 may be configured as a firmware having an architecture similar to a platform for providing an API for displaying a screen page when another application performs authentication.

When the authentication server 201 performs an authentication about logon to a Windows® domain network, the browser application 251c2 and the presentation-pattern creation module 251c3 for the authentication are incorporated in the OS 251c1 serving as a client Windows® OS, and operable to display a presentation pattern 291 on a Windows®-domain-network logon authentication screen of the authentication-requesting client 251 and prompt a user to go through an authentication procedure based on the authentication process of the present invention.

A standard Windows® logon authentication screen is specifically modified as follows. Firstly, a logon authentication module, or a program for performing the functions of the browser application 251c2 and the presentation-pattern creation module 251c3, is created as a Windows® DDL file. In this example, a DDL file having a name "SmxGina.dll" is created. Further, a program of a Windows® logon authentication screen is designated as data having a key with a name "GinaDLL" in the following registry location:

HKEY_LOCAL_MACHINE¥SOFTWARE¥Microsoft¥
   WindowsNT¥CurrentVersion ¥Winlogn

A standard logon authentication module is a DLL file "msgina.dll", and this DLL file is configured as the above data having the key with the name "GinaDLL". When the data having this key is rewritten as "SmxGina.dll", a logon authentication module implementing the authentication process of the present invention will be called during a logon authentication.

Figure 8:
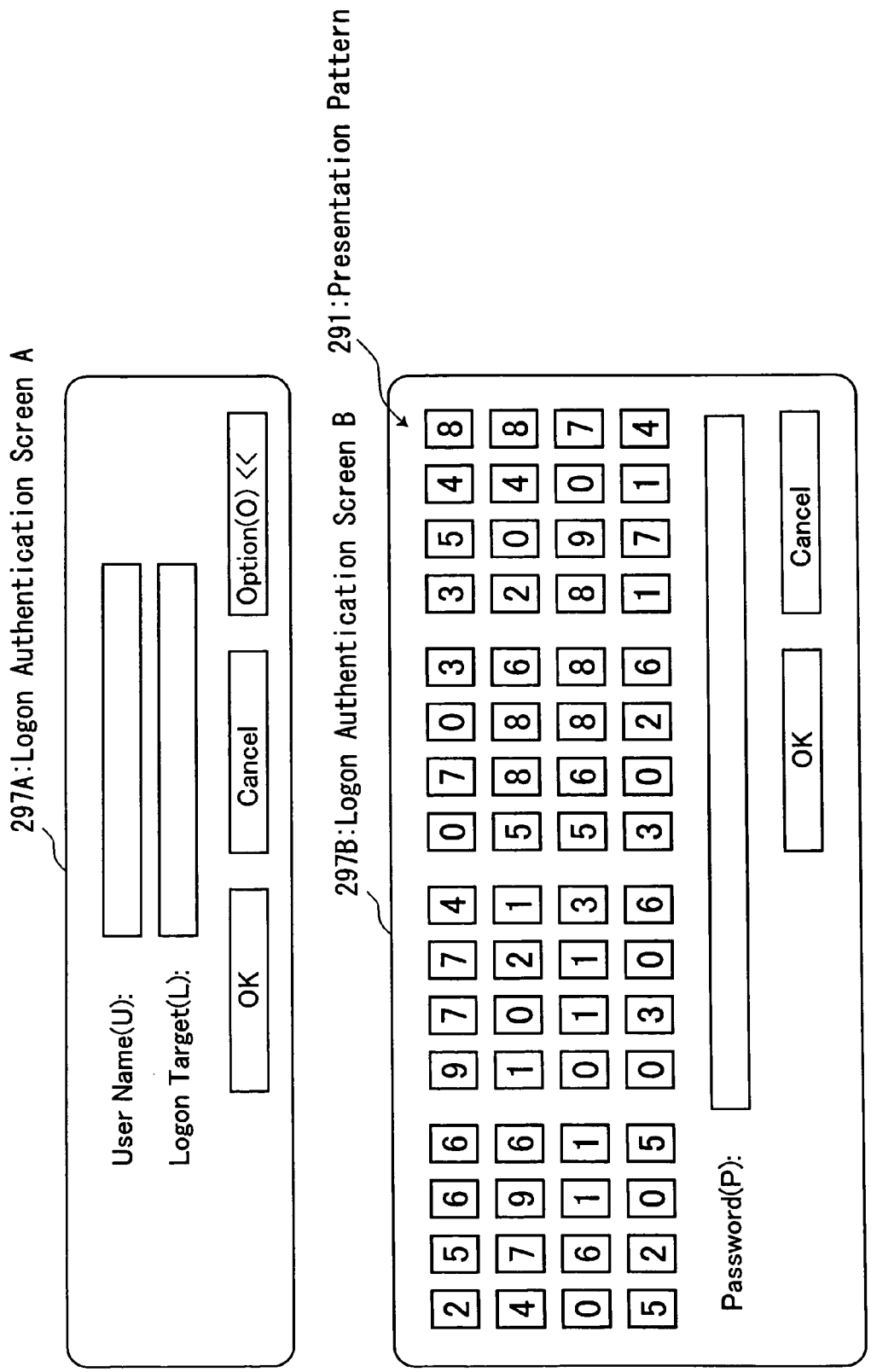
FIG. 8 is a schematic diagram showing an image on a Windows® logon authentication screen in the user authentication system 200.
Figure 9:
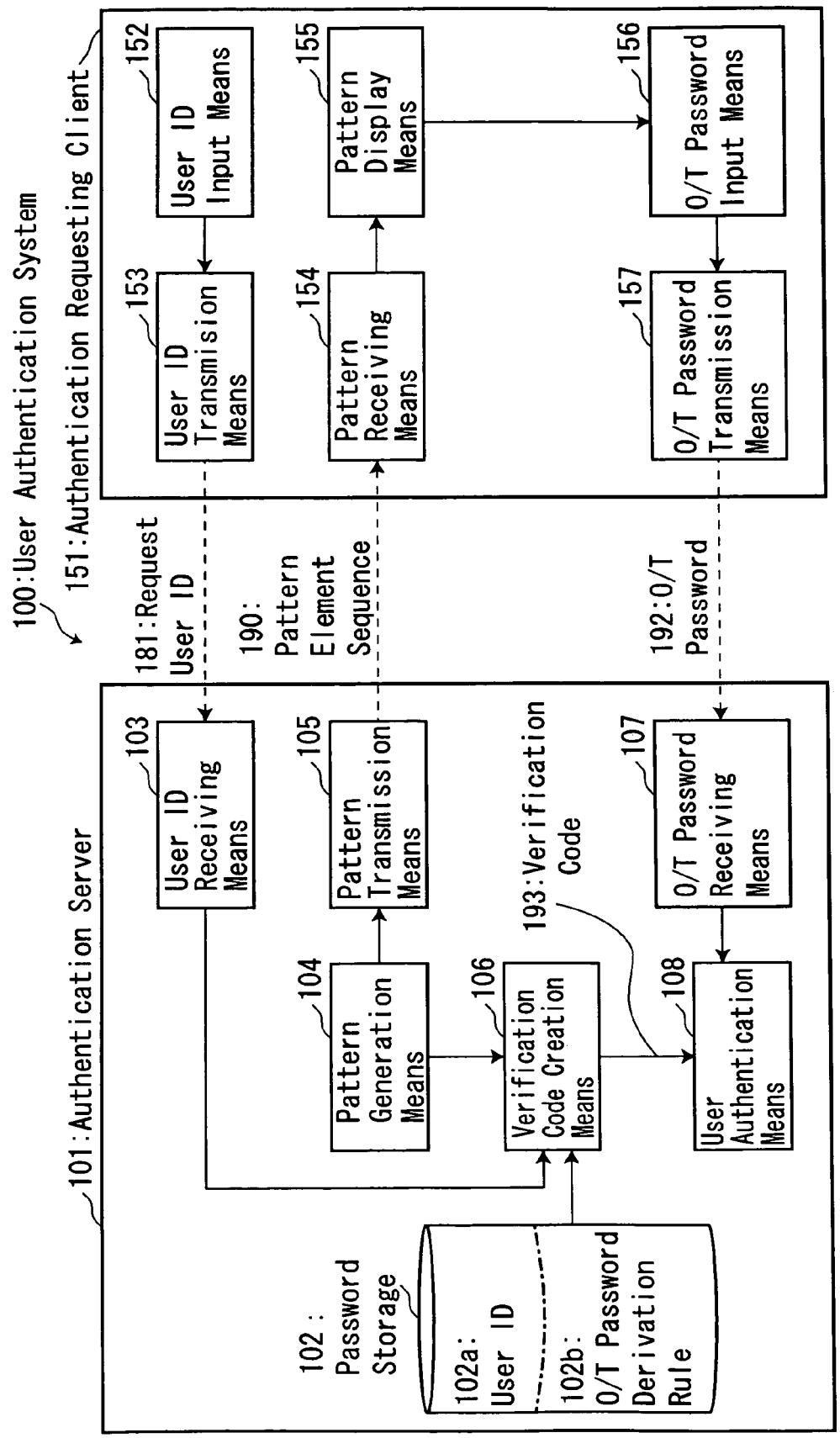
FIG. 9 is a block diagram showing a user authentication system 100 based on a conventional matrix authentication scheme.
Figure 10:
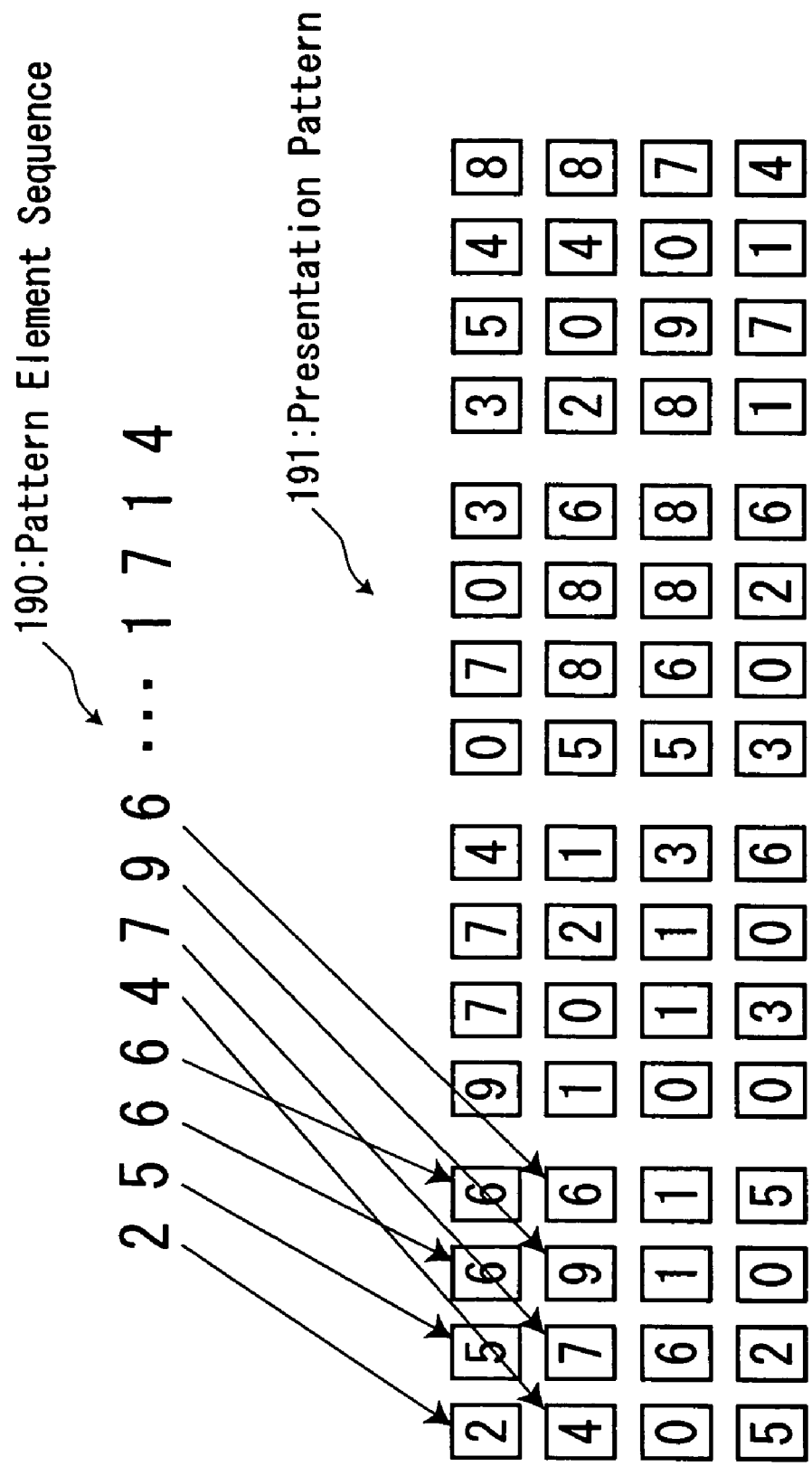
FIG. 10 is an explanatory conceptual diagram showing a process of creating a presentation pattern in the user authentication system 100 based on the conventional matrix authentication scheme.

FIG. 8 is a schematic diagram showing images on logon authentication screens 297A, 297B in the user authentication system 200. When the logon authentication module "SmxGina.dll" is activated during logon of Windows®, the logon authentication screen 297A is firstly displayed. A user-name input field and a logon-target input field are displayed on the logon authentication screen 297A. A network name can be entered into the logon-target input field to initiate a Windows®-domain-network logon authentication procedure for authorizing to use the network online. When a user enters his/her user ID serving as a request-user ID 281 into the user-name input field, the authentication module transmits the request-user ID 281 to the authentication server 201, and creates a presentation pattern 291 based on the request-user ID 281. Then, the logon authentication screen 297B including the presentation pattern 291 is displayed. The logon authentication screen 297B has a password input field. When characters, such as numerals, serving as a one-time password are entered into the password input field using the keyboard 296 or the pointing device, marks "*" are displayed one-by-one in response to the input of the characters. After completion of the input of the one-time password 292, the authentication module transmits the one-time password 292 to the authentication server 201 so as to perform user authentication, and then transmits the authentication result to a domain controller.

[Functional Configuration of User Authentication System 200]

FIG. 2 is a functional block of the user authentication system 200 according to this embodiment. FIG. 2 is a diagram expressing the hardware configuration of the user authentication system 200 illustrated in FIG. 1, from the aspect of information processing to be performed based on cooperation between software and hardware resources, wherein the information processing is illustrated on a functional block-by-functional block basis. In FIG. 2, the authentication server 201 comprises the password storage section 202, user-ID receiving means 203, verification-code creation means 206, one-time-password receiving means 207, user authentication means 208, pattern-seed-value generation means 211 and pattern-seed-value transmission means 212. These functional blocks are achieved appropriately in cooperation with hardware elements, such as the RAM 201b, the storage device 201c, the user I/F 201d and the network I/F 201e, under the condition that a required part of the user-authentication application 201c2 and a required part of the OS 201c1 are read from the storage device 201c onto the RAM 201b, and executed by the CPU 201a.

The password storage section 202 is provided as a means to store respective user IDs 202a of a plurality of users and corresponding one-time-password derivation rules 202b serving as respective passwords of the users, in associated relation with each other on a user-by-user basis. The password storage section 202 is a functional block achieved based on cooperation between software and hardware elements, such as the CPU 201a, the RAM 201b and the storage device 201c. The user-ID receiving means 203 is provided as a means to receive a request-user ID 281 entered in the authentication-requesting client 251, from the authentication-requesting client 251. The user-ID receiving means 203 is a functional block achieved based on cooperation between software and hardware elements, such as the CPU 201a, the RAM 201b and the network I/F 201e. The verification-code creation means 206 is provided as a means to create a verification code 293 as a result of applying the one-time-password derivation rule 202b serving as a password of the user subject to authentication, to a presentation pattern 291 presented in the authentication-requesting client 251. The verification-code creation means 206 is a functional block achieved based on cooperation between software and hardware elements, such as the CPU 201a and the RAM 201b. The verification code 293 has a value identical to that of a proper one-time password 292 created as a result of applying a proper one-time-password derivation rule 202b to a proper presentation pattern. The one-time-password receiving means 207 is provided as a means to receive a one-time password entered in the authentication-requesting client 251, from the authentication-requesting client 251. The one-time-password receiving means 207 is a functional block achieved based on cooperation between software and hardware elements, such as the CPU 201a, the RAM 201b and the network I/F 201e. The user authentication means 208 is provided as a means to compare between the received one-time password 292 and the created verification code 293, and successfully authenticate the user if they are identical to one another. The user authentication means 208 is a functional block achieved based on cooperation between software and hardware elements, such as the CPU 201a and the RAM 201b. The pattern-seed-value generation means 211 is provided as a means to generate a pattern seed value, or a value defining a presentation pattern in combination with a user ID, in accordance with a given generation rule. The pattern-seed-value generation means 211 is a functional block achieved based on cooperation between software and hardware elements, such as the CPU 201a and the RAM 201b. The pattern-seed-value transmission means 212 is provided as a means to transmit the generated pattern seed value 283 to the authentication-requesting client 251. The pattern-seed-value transmission means 212 is a functional block achieved based on cooperation between software and hardware elements, such as the CPU 201a, the RAM 201b and the network I/F 201e.

The authentication-requesting client 251 comprises user-ID input means 252, user-ID transmission means 253, pattern display means 255, one-time-password input means 256, one-time-password transmission means 257, pattern-seed-value receiving means 261 and pattern-element-sequence creation means 262. These functional blocks are achieved appropriately in cooperation with hardware elements, such as the RAM 251b, the storage device 251c, the user I/F 251d and the network I/F 251e, under the condition that a required part of the browser application 251c2, a required part of the presentation-pattern creation module 251c3 and a required part of the OS 251c1 are read from the storage device 251c onto the RAM 251b, and executed by the CPU 251a.

The user-ID input means 252 is provided as a means to allow the user subject to authentication to enter his/her user ID therethrough as a request-user ID 281. The user-ID input means 252 is a functional block achieved based on cooperation between software and hardware elements, such as the CPU 251a, the RAM 251b and the user I/F 251d. The user-ID transmission means 253 is provided as a means to transmit the entered request-user ID 281 to the authentication server 201. The user-ID transmission means 253 is a functional block achieved based on cooperation between software and hardware elements, such as the CPU 251a, the RAM 251b and the network I/F 251e. The pattern display means 255 is provided as a means to arrange pattern elements of a pattern element sequence 290 created by the pattern-element-sequence creation means 262 to create a presentation pattern, and display the created presentation pattern on a screen. The pattern display means 255 is a functional block achieved based on cooperation between software and hardware elements, such as the CPU 251a, the RAM 251b and the user I/F 251d. The one-time-password input means 256 is provided as a means to allow the user to enter therethrough a one-time password created from the presentation pattern displayed on the screen. The one-time-password input means 256 is a functional block achieved based on cooperation between software and hardware elements, such as the CPU 251a, the RAM 251b and the user I/F 251d. The one-time-password transmission means 257 is provided as a means to transmit the entered one-time password to the authentication server 201. The one-time-password transmission means 257 is a functional block achieved based on cooperation between software and hardware elements, such as the CPU 251a, the RAM 251b and the network I/F 251e. The pattern-seed-value receiving means 261 is provided as a means to receive a pattern seed value from the authentication server 201. The pattern-seed-value receiving means 261 is a functional block achieved based on cooperation between software and hardware elements, such as the CPU 251a, the RAM 251b and the network I/F 251e. The pattern-element-sequence creation means 262 is provided as a means to create pattern elements to be included in a presentation pattern, based on the entered request-user ID 281 and the pattern seed value 283 received from the authentication server 201 and in accordance with a given pattern-element creation rule. The pattern-element-sequence creation means 262 is a functional block achieved based on cooperation between software and hardware elements, such as the CPU 251a and the RAM 251b.

[Operation of User Authentication System 200]

An operation of the user authentication system 200 will be described below. FIGS. 3 and 4 are flowcharts showing the operation of the user authentication system 200. A user who intends to obtain authentication using the user authentication system 200 enters and registers his/her user ID 202a and a one-time-password derivation rule 202b serving as a password of the user, into/on the authentication server 201 in advance. In advance of user authentication, the password storage section 202 stores the user ID 202a and the one-time-password derivation rule 202b of the user in associated relation with one another (Step S201). Specifically, the authentication server 201 preferably provides a Web page or a resource for registration of a user ID and a password, on the Web of the Internet or an intranet. Through the Web page, the user accesses the authentication server 201 from a terminal, such as the authentication-requesting client 251. In response to the access, an input field for entering a user ID therethrough and a first presentation pattern 291 having numerals of 0 (zero) to 9 serving as pattern elements arranged in random order are displayed on a screen of the authentication-requesting client 251 (not shown). The user enters a desired user ID 202a to be registered, into the input field. Then, the user selects certain ones of the pattern elements included in the first presentation pattern 291 at specific positions and enters one or more characters, such as numerals, without being based on the presentation pattern 291, in accordance with a selected one-time-password derivation rule 202b to be registered. The authentication server 201 stores the entered user ID 202a on the password storage section 202 as a user ID of the user. The selected one-time-password derivation rule 202b cannot be specified only by the selected or entered numeric sequence. Thus, the authentication server 201 displays a second present pattern 291 different from the first presentation pattern, on the screen of the authentication-requesting client 251 to prompt the user to select or enter numerals again, in accordance with the selected one-time-password derivation rule 202b, and then compares this select or enter numeric sequence with the previous numeric sequence to specify the selected one-time-password derivation rule 202b. The second presentation pattern 291 can be generated in such a manner as to be largely different from the first present pattern 291, to allow the selected one-time-password derivation rule 202b to be specified by presenting the presentation pattern 291 only twice. If the selected one-time-password derivation rule 202b cannot be specified by presenting the presentation pattern 291 twice, the presentation pattern 291 will be repeatedly presented while changing the content thereof until the selected one-time-password derivation rule 202b can be specified. In this manner, the selected one-time-password derivation rule 202b consisting of a combination of respective positions of certain ones to be selected from the pattern elements included in the presentation pattern 291, one or more characters to be entered without being based on the presentation pattern 291, and a selection or input order of the certain pattern elements and the characters is specified. The specified one-time-password derivation rule 202b is stored on the password storage section 202 in association with the user ID 202a of the user.

Figure 5:
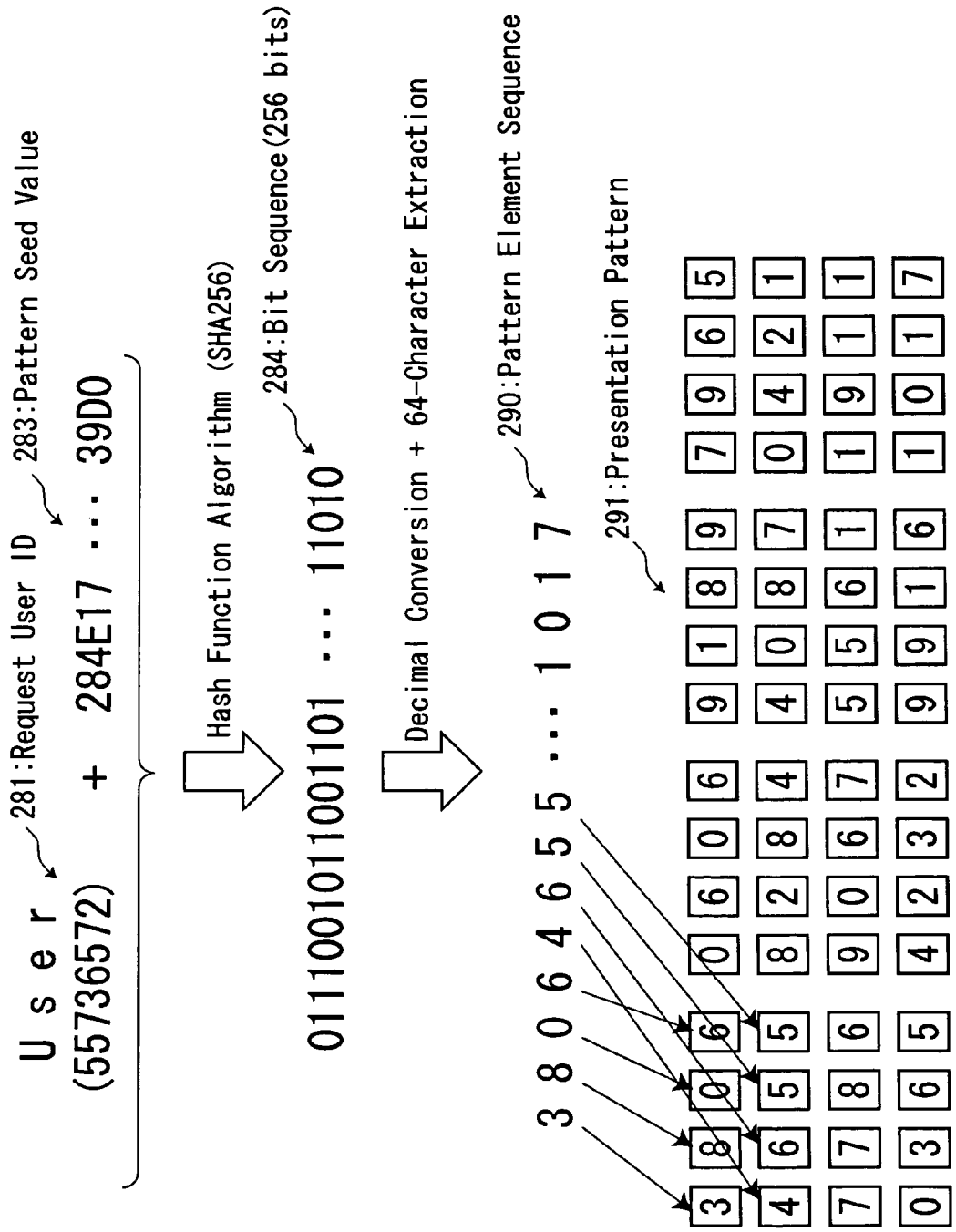
FIG. 5 is an explanatory conceptual diagram showing a process of creating a presentation pattern in the user authentication system 200.

Then, the user subject to authentication enters his/her user ID as a request-user ID 281 through the user ID input means 252 in the authentication-requesting client 251 (Step S203). In a typical example, the user accesses a user authentication Web page provided by the authentication server 201, and enters his/her user ID into a user-ID input field displayed on the Web page. In a Windows®-domain-network logon authentication, the user enters his/her user ID and a network name as a logon target, respectively, into the user-name input field and the logon-target input field in the logon authentication screen 297A illustrated in FIG. 8. Then, the authentication-requesting client 251 transmits the entered request-user ID 281 to the authentication server 201 (Step S205). In a typical example, the browser application running on the authentication-requesting client 251 transmits the request-user ID 281 entered into the input field, to the authentication server 201 through the internet or intranet. In the Windows®-domain-network logon authentication, the logon authentication module "SmxGinaDLL" transmits the request-user ID 281 to the authentication server 201. Then, the user-ID receiving means 203 in the authentication server 201 receives the request-user ID 281 transmitted from the authentication-requesting client 251 (Step S207). In a typical example, the authentication server 201 activates the user-authentication application 201c2 to receive the request-user ID 281 based on the user-authentication application 201c2. Then, the pattern-seed-value generation means 211 in the authentication server 201 generates a pattern seed value 283 in accordance with a given generation rule (Step S209). Typically, the given generation rule is to generate random numbers within a given range. As one example of the pattern seed value 283, FIG. 5 shows "284E17 - - - 39D0" expressed in hexadecimal. For example, the pattern seed value 283 may be expressed by a numeric sequence having a given bit length, such as 8-byte. In this case, the given range is a range of "0000000000000000" to "FFFFFFFFFFFFFFFF" in hexadecimal. Thus, with respect to the same user ID 202a, any numeric sequence within the given range may be used as a pattern seed value 283. Thus, the number of different presentation patterns to be created can be increased up to the number of pattern seed values included in the given range.

Then, the pattern-seed-value transmission means 212 in the authentication server 201 transmits the generated pattern seed value 283 to the authentication-requesting client 251 (Step S211). In a typical example, the authentication server 201 activates the user-authentication application 201c2 to transmit the pattern seed value 283 based on the user-authentication application 201c2. Then, the pattern-seed-value receiving means 261 in the authentication-requesting client 251 receives the pattern seed value 283 transmitted from the authentication server 201 (Step S213). In a typical example, the browser application 251c2 or the logon authentication module "SmxGinaDLL" running on the authentication-requesting client 251 receives the pattern seed value 283. Then, the pattern-element-sequence generation means 262 in the authentication-requesting client 251 creates a pattern element sequence 290 for forming a presentation pattern 291, based on the request-user ID 281 entered in Step S203 and the pattern seed value 283 received in Step S213 and in accordance with a given pattern-element-sequence creation rule (Step S215). The given pattern-element-sequence creation rule means a rule for generating a pattern element sequence uniquely determined based on a combination of the request-user ID 281 and the pattern seed value 283, in such a manner as to provide significant difficulty in estimating the original request-user ID 281 and pattern seed value 283 from only the pattern element sequence. Typically, the given pattern-element-sequence creation rule is based on an encryption algorithm using the combination of the request-user ID 281 and the pattern seed value 283 as a sort of initial value, as described in more detail below. FIG. 5 is an explanatory conceptual diagram showing a process of creating a presentation pattern 291. In FIG. 5, a pattern element sequence 290 is created based on "User" as a request-user ID 281, and "284E17 - - - 39D0" as a pattern seed value 283. For this purpose, a given numeric sequence is uniquely created based on the combination of the request-user ID 281 and the pattern seed value 283. In an example indicated by the uppermost row and the second row in FIG. 5, the combination of the request-user ID 281 and the pattern seed value 283 expressed in hexadecimal are combined together to create a given numeric sequence. Alternatively, the request-user ID 281 and the pattern seed value 283 may be combined together using any suitable operation, such as addition, subtraction and/or exclusive-OR operation. Then, the given numeric sequence is subjected to an encryption algorithm to create a bit sequence 284 having a given bit length. In FIG. 5, the given bit length is 256 bits which is an information amount enough to create a presentation pattern 291 consisting of sixty four numerals. The encryption algorithm may be any suitable type capable of practically precluding an original numeric sequence from being derived from an algorithmic result, such as a hash function algorithm or a symmetric-key encryption algorithm. For example, SHA-256 may be used as a hash function to encrypt the given numeric sequence so as to create a bit sequence 284 of 256 bits. Alternatively, the Advanced Encryption Standard (AES) algorithm may be used as a symmetric-key encryption algorithm to create a key from the given numeric sequence, and encrypt a 256-bit numeric sequence appropriately pre-set using the key so as to create a bit sequence 284 of 256 bits. Further, a hash function algorithm and a symmetric-key encryption algorithm may be used in combination. The values "0111001011001101 - - - 11010" of the bit sequence 284 in FIG. 5 are shown as one example for illustrative purposes, but not shown as an accurate algorithmic result of the SHA-256 algorithm. Then, the bit sequence 284 of 256 bits is converted to a seventy seven-digit decimal numeral, and a sixty four-digit numeral is extracted therefrom to be used as a pattern element sequence 290. The values "38064655 - - - 1017" of the patter element sequence 290 in FIG. 5 are shown as one example for illustrative purposes, but not shown as an accurate result of the conversion/extraction. The sixty four-digit numeral may be extracted by eliminating unnecessary higher-order bits or lower-order bits, or using any suitable operation, such as subtraction. Then, the pattern display means 255 in the authentication-requesting client 251 creates an image of a presentation pattern 291 formed by arranging pattern elements of the pattern element sequence 290, respectively, at element positions in a given pattern format consisting of four 4×4 matrixes, and displays the image on the screen of the authentication-requesting client 251 (Step S217). In the Windows®-domain-network logon authentication, as shown in FIG. 8, after the display of the logon authentication screen 297A, the logon authentication screen 297B including the presentation pattern 291 is displayed.

Then, the user subject to authentication selects certain ones of the pattern elements at specific positions in the presentation pattern 291 displayed on the screen of the authentication-requesting client 251 and enters one or more characters, such as numerals, without being based on the presentation pattern 291, in a given order, so as to enter into the authentication-requesting client 251 a one-time password 292 created as a result of applying the one-time-password derivation rule 202b of the user to the presentation pattern 291. The one-time-password input means 256 in the authentication-requesting client 251 allows the user to enter the one-time password 292 therethrough (Step S219). Then, the one-time-password transmission means 256 in the authentication-requesting client 251 transmits the entered one-time password 292 to the authentication server 201 (Step S221). Then, the one-time-password receiving means 207 in the authentication server 201 receives the one-time password 292 transmitted from the authentication-requesting client 251 (Step S223).

Then, the verification-code creation means 206 in the authentication server 201 creates a verification code 293 as a result of applying the one-time-password derivation rule 202b corresponding to the request-user ID 281 received from the authentication-requesting client 251, to a presentation pattern formed from a pattern element sequence created based on the request-user ID 281 and the pattern seed value 283 transmitted to the authentication-requesting client 251 and in accordance with a given pattern-element-sequence creation rule (Step S225). The given pattern-element-sequence creation rule is identical to the pattern-element-sequence creation rule used by the pattern-element-sequence creation means 262 to generate the pattern sequence in Step S215. Thus, the verification code 293 has a value identical to that of a proper one-time password 292 created as a result of applying a proper one-time-password derivation rule 202b associated with a user of a request-user ID 281, to a proper presentation pattern created based on the request-user ID 281 and a proper pattern seed value 283. Then, the user authentication means 208 in the authentication server 201 compares the received one-time password 292 and the created verification code 293, and successfully authenticates the user if they are identical to one another (Step S227). If the authentication is successfully concluded, the use of a service depending on the user authentication modes will be authorized as follows. In the authentication mode for authorizing a user to use a specific content on the Web or the like, the user is authorized to access the content or to use an application. In the authentication mode for authorizing a user to logon to a Windows® domain network, the authentication server 201 informs the authentication result to a Windows® domain controller to authorize the user to log into the Windows® network. In the authentication server 201 serving as a SSL-VPN gateway, the user is authorized to access the SSL-VPN.

In the above operational flow, as long as any inconsistency in operational flow, such as a situation where data obviously unusable in a certain step is used in the step, does not occur, the operational flow may be freely modified. For example, while a verification code 293 is created by the authentication server 201 in Step S225, it may be created just after Step S209 where both the request-user ID 281 and the pattern seed value 283 become available. Further, while the request-user ID 281 is received by the authentication server 201 in Step S207, it may be received after any timing after Step S207 and before Step S225 where a verification code 293 is created by the authentication server 201.

The preferred embodiment of the present invention has been described for illustrative purposes, but the present invention is not limited to the specific embodiment. It is obvious to those skilled in the art that various changes and modifications may be made therein without departing from the spirit and scope thereof as set forth in appended claims.

What is claimed:

1. A user authentication system, located on a recording medium, designed to arrange a plurality of pattern elements in a given pattern format so as to create a presentation pattern to be presented to a user subject to authentication, and apply a one-time-password derivation rule serving as a password of said user to certain ones of the pattern elements included in said presentation pattern at specific positions so as to create a one-time password, said user authentication system comprising:

an authentication server for managing respective user IDs and passwords of users of the system; and an authentication-requesting client connected to said authentication server via a network, to serve as a terminal for allowing each of the users to request authentication therethrough, wherein said authentication server includes:

a password storage section pre-storing the user IDs and the one-time-password derivation rules of the users in associated relation with each other on a user-by-user basis;

pattern-seed-value generation means for generating, in accordance with a given generation rule, a pattern seed value adapted to be combined with one of the user IDs so as to allow a presentation pattern to be uniquely determined;

user-ID receiving means for receiving the user ID of the user subject to authentication, from the authentication-requesting client of said user; and pattern-seed-value transmission means for transmitting said generated pattern seed value, to the authentication-requesting client of said user subject to authentication, and wherein said authentication-requesting client includes:

user-ID input means for allowing the user to enter his/her user ID therefrom;

user-ID transmission means for transmitting said entered user ID to said authentication server;

pattern-seed-value receiving means for receiving the transmitted pattern seed value transmitted from said authentication server;

pattern-element-sequence creation means for creating, based on said entered user ID and said received pattern seed value and in accordance with a given pattern-element-sequence creation rule, a pattern element sequence consisting of a set of pattern elements for forming a presentation pattern;

pattern display means for arranging the pattern elements included in said created pattern element sequence, in said given pattern format, to create the presentation pattern, and displaying said created presentation pattern on a screen;

one-time-password input means for allowing said user to enter therefrom a one-time password created as a result of applying said one-time-password derivation rule to the pattern elements included in said displayed presentation pattern; and one-time-password transmission means for transmitting said entered one-time password to said authentication server of the user subject to authentication, wherein said authentication server further includes:

one-time-password receiving means for receiving said transmitted one-time password;

verification-code creation means for creating a verification code as a result of applying the one-time-password derivation rule corresponding to said received user ID, to certain pattern elements included in a presentation pattern formed from a pattern element sequence which is created based on said received user ID and said transmitted pattern seed value and in accordance with said given pattern-element-sequence creation rule; and user authentication means for comparing said received one-time password with said created verification code, and successfully authenticating the user corresponding to said received user ID if they are identical to one another.

2. The user authentication system as defined in claim 1, wherein said given pattern-element-sequence creation rule in said pattern-element-sequence creation means is designed to apply a symmetric-key encryption algorithm using a key consisting of a value based on said entered user ID and said received pattern seed value, to a given initial character sequence, so as to allow said pattern element sequence to be created based on a result of said algorithm.

3. The user authentication system as defined in claim 1, wherein said given pattern-element-sequence creation rule in said pattern-element-sequence creation means is designed to apply a hash function algorithm to a value based on said entered user ID and said received pattern seed value, so as to allow said pattern element sequence to be created based on a result of said algorithm.

4. The user authentication system as defined in claim 1, wherein:

said one-time-password transmission means is operable to apply a given hash function algorithm to said entered one-time password and then transmit an obtained hashed one-time password to said authentication server;

said verification-code creation means operable to apply said given hash function algorithm to said result of applying the one-time-password derivation rule corresponding to said received user ID, to certain pattern elements included in a presentation pattern formed from a pattern element sequence which is created based on said received user ID and said transmitted pattern seed value and in accordance with said given pattern-element-sequence creation rule, so as to create a hashed verification code; and said user authentication means is operable to compare said received hashed one-time password with said created hashed verification code, and successfully authenticate the user corresponding to said received user ID if they are identical to one another.

5. The user authentication system as defined in claim 4, wherein said one-time-password derivation rule consists of a combination of respective positions of certain ones to be selected from the pattern elements included in the presentation pattern, and a selection order of said certain pattern elements.

6. The user authentication system as defined in claim 5, wherein said one-time-password derivation rule consists of a combination of: respective positions of certain ones to be selected from the pattern elements included in the presentation pattern; one or more characters to be entered without being based on the presentation pattern; and a selection or input order of said certain pattern elements and said characters.

7. The user authentication system as defined in claim 5, wherein the pattern elements to be included in the presentation pattern are selected from ten numerals of 0 (zero) to 9 and a symbol.

8. The user authentication system as defined in claim 7, wherein the pattern elements to be included in the presentation pattern are selected from ten numerals of 0 (zero) to 9.

9. The user authentication system as defined in claim 8, wherein said given pattern format for use in arranging the plurality of pattern elements to create the presentation pattern includes a matrix having a number m of matrix elements in height and a number n of matrix elements in width to form a rectangular shape in its entirety.

10. A user authentication method for use in a user authentication system designed to arrange a plurality of pattern elements in a given pattern format so as to create a presentation pattern to be presented to a user subject to authentication, and apply a one-time-password derivation rule serving as a password of said user to certain ones of the pattern elements included in said presentation pattern at specific positions so as to create a one-time password, said user authentication system including an authentication server adapted to manage respective user IDs and passwords of users of the system and connected via a network to an authentication-requesting client serving as a terminal for allowing each of the users to request authentication there through, said authentication server being operable, in response to an authentication request from said authentication-requesting client, to perform authentication, said user authentication method comprising the steps of:

pre-storing the user IDs and the one-time-password derivation rules of the users in associated relation with each other on a user-by-user basis in said authentication server;

entering a user ID into the authentication-requesting client;

transmitting said entered user ID from said authentication-requesting client to said authentication server;

receiving said transmitted user ID from said authentication-requesting client, at said authentication server;

generating, in accordance with a given generation rule, a pattern seed value adapted to be combined with one of the user IDs in said authentication server so as to allow a presentation pattern to be uniquely determined;

transmitting said generated pattern seed value from said authentication server to the authentication-requesting client of the user subject to authentication;

receiving said transmitted pattern seed value from said authentication server, at said authentication-requesting client;

creating, based on said entered user ID and said received pattern seed value and in accordance with a given pattern-element-sequence creation rule, a pattern element sequence consisting of a set of pattern elements for forming a presentation pattern, in said authentication requesting client;

arranging, in said authentication requesting client, the pattern elements included in said created pattern element sequence, in said given pattern format, to create the presentation pattern, and display said created presentation pattern on a screen;

entering a one-time password created as a result of applying said one-time-password derivation rule to the pattern elements included in the displayed presentation pattern, into said authentication-requesting client;

transmitted said entered one-time password from said authentication-requesting client to said authentication server;

receiving said transmitted one-time password from said authentication-requesting client, at said authentication server;

creating a verification code as a result of applying the one-time-password derivation rule corresponding to said received user ID, to certain pattern elements included in a presentation pattern formed from a pattern element sequence which is created based on said received user ID and said transmitted pattern seed value and in accordance with said given pattern-element-sequence creation rule, in said authentication server; and comparing said received one-time password with said created verification code, and successfully authenticate the user corresponding to said received user ID if they are identical to one another, in said authentication server.

* * * * *